United States Patent [19]

Ozamoto et al.

[11] Patent Number: 5,543,600
[45] Date of Patent: Aug. 6, 1996

[54] LATTICE WELDING ROBOT AND METHOD FOR THE LATTICE WELDING

[75] Inventors: Daisuke Ozamoto; Masatoshi Murayama; Yuji Sugitani, all of Kawasaki, Japan

[73] Assignee: NKK Corporation, Kawasaki, Japan

[21] Appl. No.: 393,378

[22] Filed: Feb. 23, 1995

[30] Foreign Application Priority Data

Apr. 12, 1994 [JP] Japan .................................. 6-073591

[51] Int. Cl.⁶ ................................................. B23K 9/127
[52] U.S. Cl. .............................. 219/124.34; 219/124.31; 219/125.12
[58] Field of Search ........................ 219/124.34, 124.31, 219/124.1, 124.22, 125.12, 125.1

[56] References Cited

U.S. PATENT DOCUMENTS

| | | |
|---|---|---|
| 4,441,011 | 4/1984 | Nomura et al. . |
| 4,704,513 | 11/1987 | Sugitani et al. ................... 219/124.34 |
| 4,926,023 | 5/1990 | Sugitani et al. . |

FOREIGN PATENT DOCUMENTS

| | | |
|---|---|---|
| 64-15287 | 1/1989 | Japan . |
| 64-15286 | 1/1989 | Japan . |
| 4-319072 | 11/1992 | Japan . |

*Primary Examiner*—Clifford C. Shaw
*Attorney, Agent, or Firm*—Frishauf, Holtz, Goodman, Langer & Chick

[57] ABSTRACT

A lattice welding robot detects an X-axis slide position of $X_p$ by an arc sensor of a welding torch, compares the value of $X_p$ with a reference value of $X_0$ by a comparator, calculates a differential value of the value of $X_p$ by a differentiator and computes a travel speed correction amount $\Delta V$ from a difference between a comparator output value and a differentiator output value by a computing unit. The correction amount $\Delta V$ is added to an initial speed of each of inside wheels and outside wheels of a welding carriage to control each of driving motors for the inside wheels and the outside wheels by an adding speed command $V_{in}$ and an adding speed command $V_{out}$, respectively. Thereby, a rough guidance for the welding carriage to trace a weld line is performed.

36 Claims, 9 Drawing Sheets

| CARRIAGE STATE | $x_p$ | $\frac{dx_p}{dt}$ | TRAVEL SPEED COMMAND |
|---|---|---|---|
| A | − | − | GREAT DEPARTURE |
| B | − | 0 | SLIGHT DEPARTURE |
| C | − | + | STRAIGHT ADVANCE |
| D | 0 | − | SLIGHT DEPARTURE |
| E | 0 | 0 | STRAIGHT ADVANCE |
| F | 0 | + | SLIGHT APPROACH |
| G | + | − | STRAIGHT ADVANCE |
| H | + | 0 | SLIGHT APPROACH |
| I | + | + | GREAT APPROACH |

WELD LINE

LATTICE WELDING ROBOT AND METHOD FOR THE LATTICE WELDING

BACKGROUND OF THE INVENTION

1. Field of the Invention

The present invention relates to a self-driven welding robot for welding rectangular fillet weld joints of a product in the field of heavy industries and, more particularly to a self-driven lattice welding robot to which is mounted a welding gun having an arc sensor function.

2. Description of Related Arts

Lattice welding robots which automatically perform rectangular fillet welding of a lattice block, of which the base material is of a lattice shape, by using a high-speed rotating arc welding torch of the arc sensor type, have been disclosed in Japanese Unexamined Patent Publications No. 64-15286, No. 64-15287, and No. 4-319072. All of these publications, having a high-speed rotating arc welding torch, automatically perform rectangular fillet welding of a lattice block while carrying out tracer control of a weld line by a known high-speed rotating arc welding method of the arc sensor type. However, because the employed welding carriage is of a self-driven type, the travel direction of the carriage is not always in parallel with the weld line due to disturbances such as the state of a cable and the state of the work. Therefore, although the tracing control is carried out precisely by the arc sensor, the welding speed at the weld line portion changes, or the range in which the torch aiming position is corrected by the stroke limit of the arc sensor is limited.

For this reason, it is required for the welding carriage to trace the travel direction roughly by steering the carriage so that the travel direction is nearly parallel with the weld line.

For the conventional welding robots, a rough guidance control for carriage travel has been carried out by the following methods:

(1) Guide roller system shown in Japanese Unexamined Patent Publication No. 64-15286:

The robot disclosed in this publication, which is provided with two tracing guide rollers at the side of the welding carriage, performs a rough tracing of the weld line while bringing the guide rollers into contact with a vertical plate surface of a lattice block.

This system, however, has disadvantages such as (1) it is influenced by the state of the vertical plate surface, and (2) the guide rollers hinder the turning of the welding robot.

(2) Non-contact distance sensor system shown in Japanese Unexamined Patent Publication No. 4-319072:

This system uses two non-contact distance sensors in place of the aforementioned guide rollers. The two distance sensors detect the distance between the welding carriage and a vertical plate, and the speeds of the inside and outside wheels of the carriage are controlled so that the two detected distances are equal.

However, this system using, for example, a laser sensor, is very vulnerable to fumes and is expensive.

(3) Arc sensor system shown in Japanese Unexamined Patent Publication No. 64-15287:

This system provides rough tracing of a weld line, so that the distance between the welding torch and a vertical plate is nearly constant, on the basis of the information about the horizontal (X-axis) slide position of the welding torch, controlled by an arc sensor.

However, the distance information of only one point does not tell the inclination of the welding carriage, so that travel control of the carriage is difficult to carry out.

SUMMARY OF THE INVENTION

The object of the present invention is to provide a lattice welding robot which controls the rough guidance for the carriage travel by using only the information given by an arc sensor.

To attain this object, the present invention provides a lattice welding robot which comprises:

a self-driven welding carriage having a pair of driving wheels which can be controlled independently to run and turn the welding carriage;

a welding torch for rotating a welding wire at a torch tip end at a high speed;

an X-axis slide mechanism for moving the welding torch in a horizontal direction;

a Y-axis slide mechanism for moving the welding torch in a torch axis direction to keep a torch height constant;

a detector for detecting a corner portion of a member material to be welded so as to enable a turning operation at the corner portion to be carried out;

axis direction control means for controlling an X-axis direction and a Y-axis direction of the welding torch by using an arc sensor;

setting means for setting the welding carriage at a welding start position; and a rough guidance controller for controlling a travel direction of the welding carriage, the rough guidance controller comprising:

an X-axis detector for detecting an X-axis slide position of the welding torch when the welding torch is controlled to be positioned at a center of a welding groove by the arc sensor;

a comparator for comparing the detected X-axis slide position with a present reference value of the X-axis slide position of the welding torch;

a calculating unit for calculating a differential value of the detected X-axis slide position of the welding torch; and a control unit for controlling an advancing direction of the welding carriage by supplying independently an adding speed signal to the pair of driving wheels from the above information so as to cause said carriage to run substantially parallel with the weld line direction and to keep a substantially constant distance between the welding carriage and the weld line, whereby the X-axis direction slide position of the welding torch is located at a proper position for welding.

DETAILED DESCRIPTION

Figure 2A:
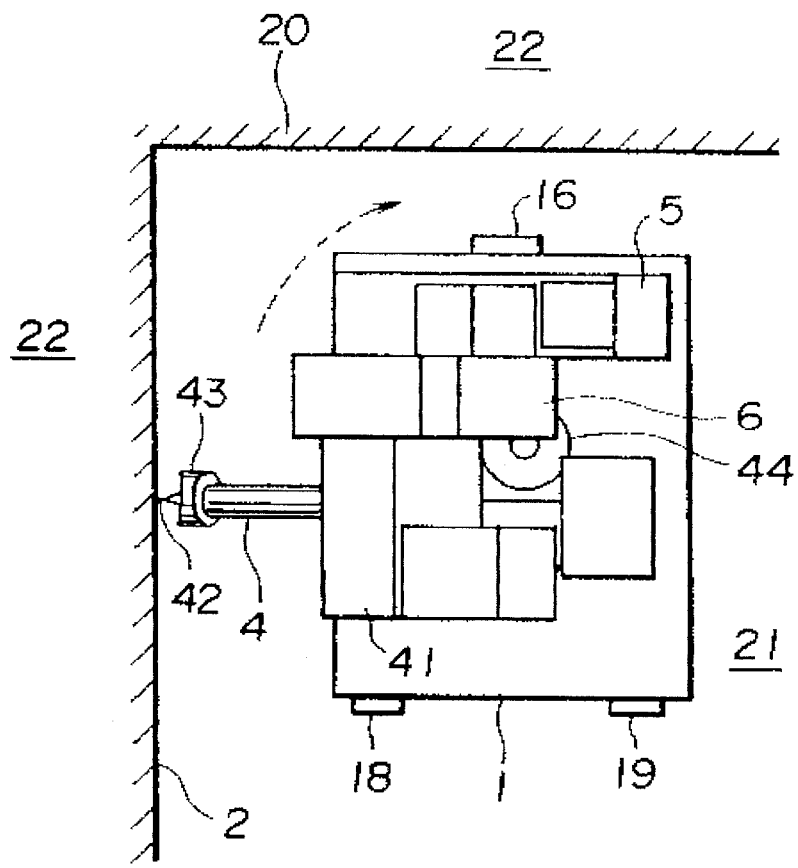
FIG. 2(A) is a top plan view of a lattice welding robot in accordance with an embodiment of the present invention.
Figure 3:
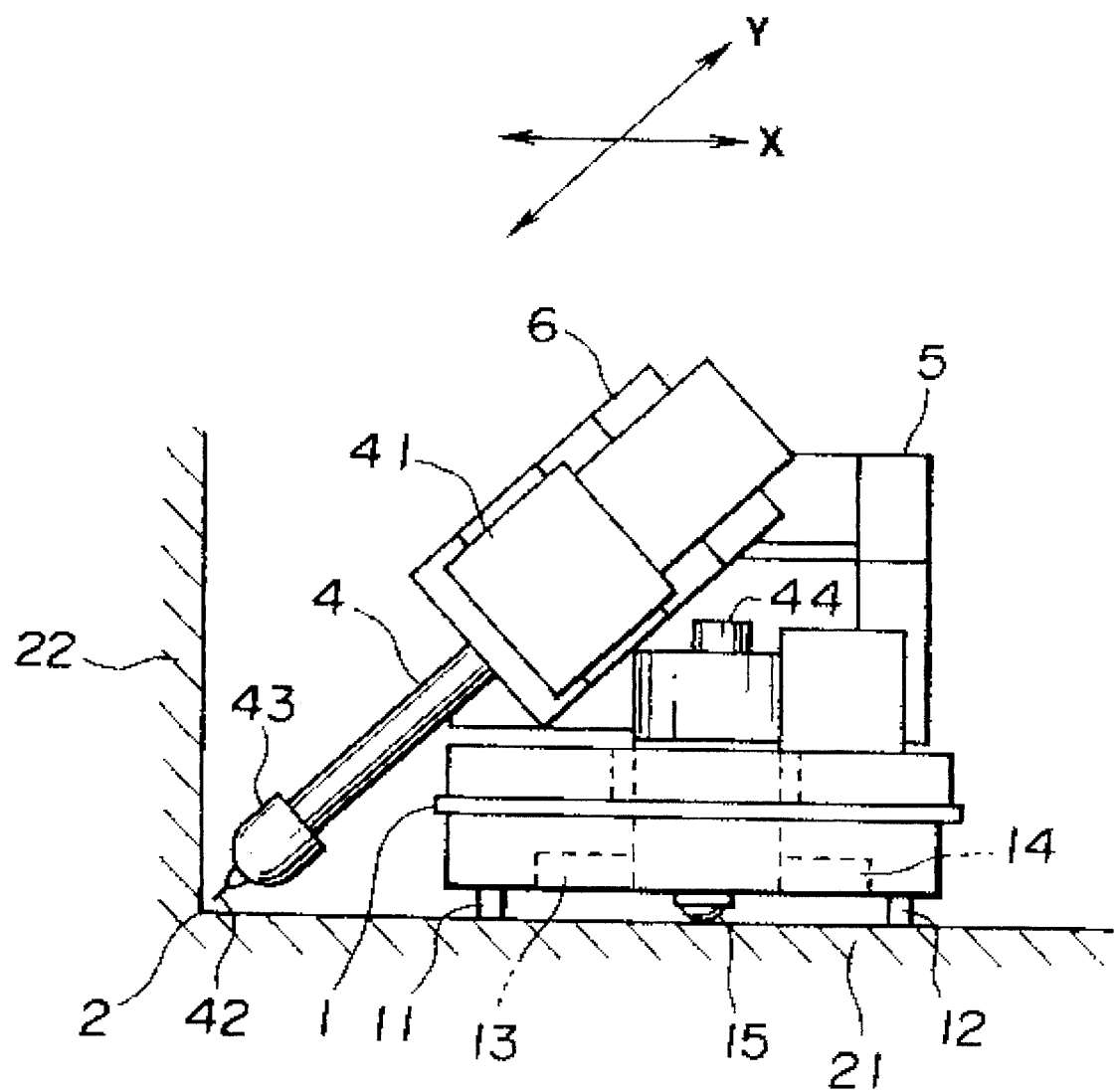
FIG. 3 is a front view of the lattice welding robot shown in FIG. 2(A)
Figure 4:
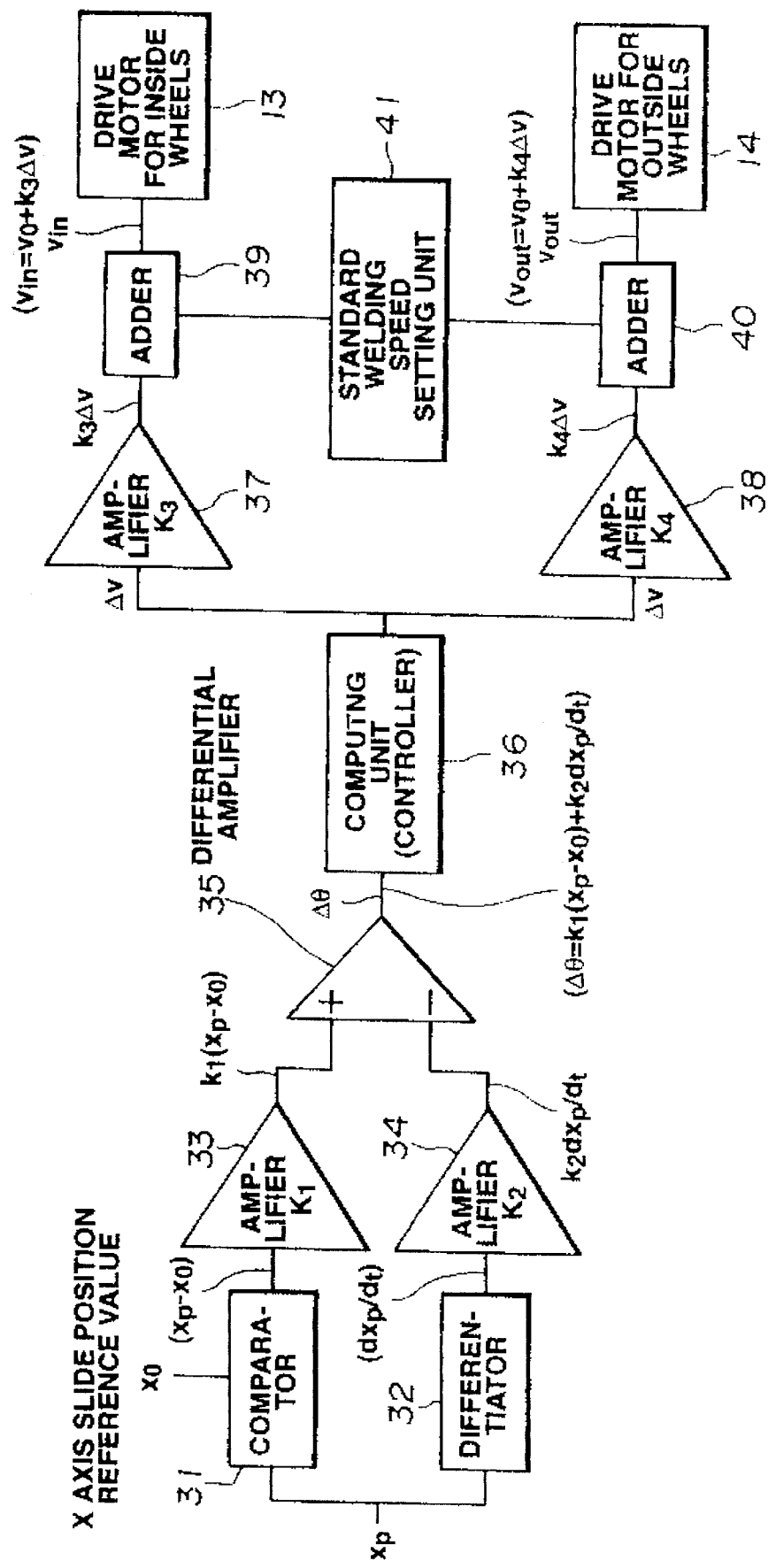
FIG. 4 is a block diagram of the rough guidance control system for controlling carriage travel of the lattice welding robot.

FIG. 2(A) is a plan view of a lattice welding robot in accordance with an embodiment of the present invention, FIG. 3 is a front view of the welding robot, and FIG. 4 is a block diagram illustrating a rough guidance control system for controlling carriage travel of the lattice welding robot.

As shown in FIGS. 2(A) and 3, a welding carriage 1 has a pair of front and rear inside wheels 11 and a pair of front and rear outside wheels 12 as viewed from a weld line 2. The pair of inside wheels 11 and the pair of outside wheels 12 are independently driven by driving motors 13 and 14, respectively. Reference numeral 15 denotes a free roller or a ball caster arranged at a central portion of the carriage bottom. A proximity switch 16, which is provided at a front end of the carriage 1, is used for determining a turning position of the welding carriage 1 at a corner portion of a lattice block. A turning angle of the carriage 1 is detected by an encoder 44 coupled to an axle of either one of the pairs of driving wheels 11, 12.

Limit switches 18 and 19, which are mounted at a rear end of the welding carriage 1, are used to provide parallelism when the welding carriage 1 starts running.

A welding torch 4, which is provided on the welding carriage 1, rotates at a high speed so as to perform a precession around a torch axis (Y-axis) by using a rotation mechanism 41 with a gear mechanism. Therefore, an arc at a tip end of a welding wire 42 rotates at a high speed.

An X-axis slide mechanism 5 and a Y-axis slide mechanism 6, which slide the welding torch 4 in the X-axis and Y-axis directions respectively, each comprise a feed mechanism such as a ball screw mechanism. Slide mechanisms 5 and 6 comprise a position correcting mechanism for performing a weld line tracing control by using an arc sensor.

Figure 2B:
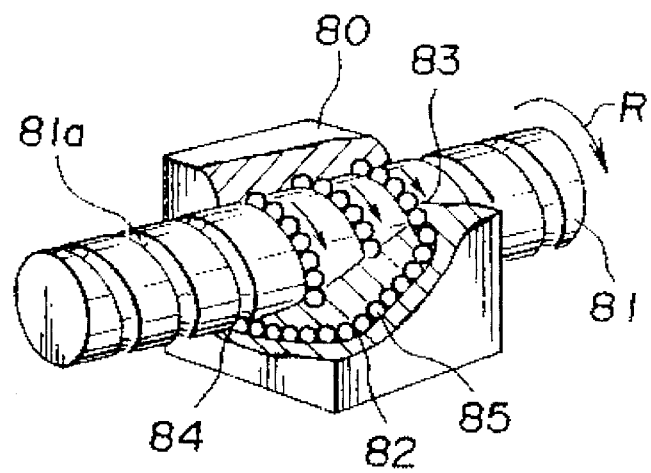
FIG. 2(B) is a partially broken perspective view of a ball screw feed mechanism of the present invention.

FIG. 2(B) illustrates a ball screw feed mechanism. The reference numeral 80 denotes nut block, 81 spirally grooved shaft and 85 steel balls. At a center portion of the nut block 80, a pass-hole is formed, and the spirally grooved shaft 81 passes through the pass-hole. On an inner wall of the pass-hole, there is a spiral guide groove made for the transfer of the steel balls 85 by having the steel balls 85 meet semi-spherically with the spiral guide groove of the inner wall. Further, return hole 82 which connects one end 83 and the other end 84 of the spiral guide groove is formed inside of the nut-block 80, the return hole 82 guiding the steel balls 85. Thus, by means of the combination of the inner wall of the pass-hole of the nut-block 80 and the spirally grooved shaft 81, a spirally shaped hole is formed. And this spirally shaped hole and the return hole 82 are filled with a plurality of the steel balls in a state of a mechanism where the steel balls can be movably rotated. In such a manner the ball screw feed mechanism is constructed. When the spirally grooved shaft 81 is rotated in the direction of an arrow of R in FIG. 2(B) on the condition that the spirally grooved shaft 81 can be rotated by being mounted on bearings on both sides of the spirally grooved shaft 81, the plurality of the steel balls rotate and at the same time move in the direction of the arrow. Thanks to the movement of the steel balls, the nut-block 80 moves in the axial direction of the spirally grooved shaft 81.

A lattice block 20 is formed into a lattice shape by a horizontal plate 21 and surrounding vertical plates 22, providing a rectangular weld line 2.

Figure 5A:
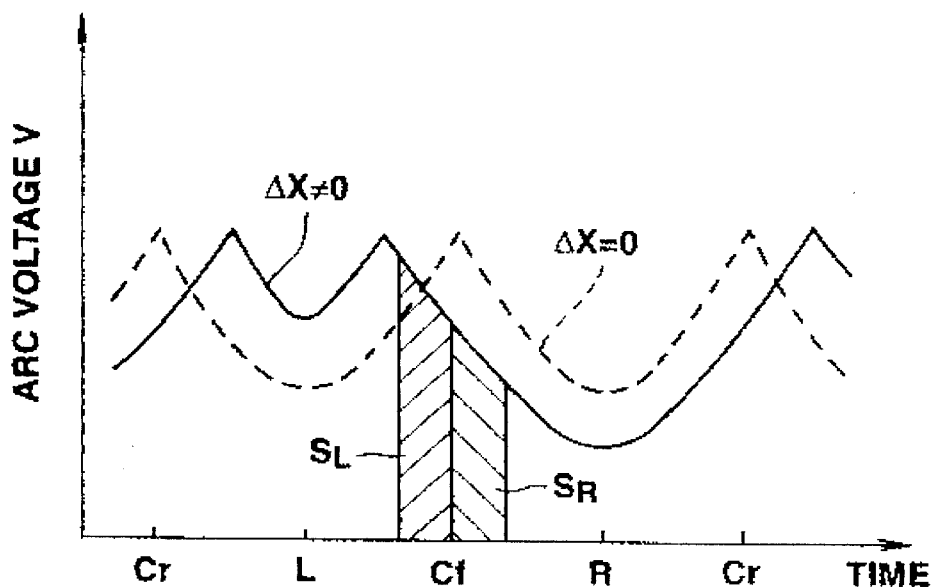
FIGS. 5(A)–5(C) are views illustrating a principle of an arc sensor.
Figure 5B:
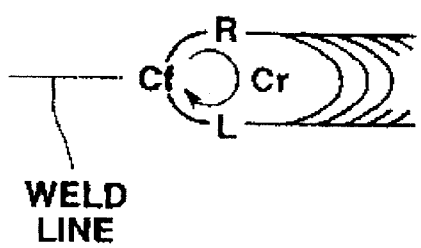
Figure 5C:
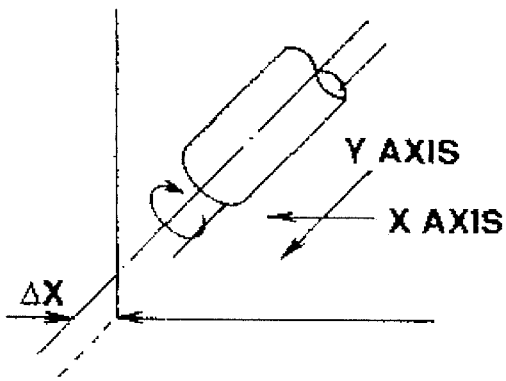

The principle of using an arc sensor for performing weld line tracing control will be described briefly. The arc sensor is also disclosed in detail on column 5, line 54 bridging column 7, line 28 of U.S. Pat. No. 4,441,011 with reference to FIG. 4 thereof. FIG. 5(A) shows a relationship between a rotating arc generating position in terms of time and an arc voltage. In FIG. 5(A), when the welding torch 4 which rotates at a high speed (see FIG. 5(B)) is positioned at a root of a groove ($\Delta X=0$), an arc voltage waveform shows a maximum value at points $C_f$ and $C_r$, and a minimum value at points L and R, as indicated by the broken line, the arc voltage waveform being symmetrical in the right and left direction with respect to point $C_f$. When the welding torch 4 for performing a high speed arc welding shifts to a vertical plate side ($\Delta X \neq 0$), as shown in 5(C) the arc voltage waveform is asymmetrical in the right and left direction with respect to point $C_f$, as indicated by the solid line in FIG. 5(A). Therefore, a torch aiming position in the X-axis direction is detected by comparing the waveform areas $S_L$ and $S_R$ surrounded by a phase angle $\phi$ at the right and left of point, $C_f$. Actually, the value of $\phi$ is set to be 90 degrees or less because the waveform is distorted by the influence of a molten pool on the rear $C_r$ side. The control of the welding torch in the axial direction (Y-axis) is carried out by a method in which the welding current is constant. The welding torch is also disclosed in detail on column 3, line 1 bridging column 4, line 10 of U.S. Pat. No. 4,926,023 with reference to FIGS. 1(A) and 1(B) thereof.

The entire contents of both of U.S. Pat. Nos. 4,441,011 and 4,926,023 are incorporated herein by reference.

Now, the operation of the above-described welding robot will be described with reference to FIGS. 6(A), 6(B), 6(C) and 6(D), and FIGS. 7(A), 7(B), 7(C), 7(D) and 7(E).

Figure 6A:
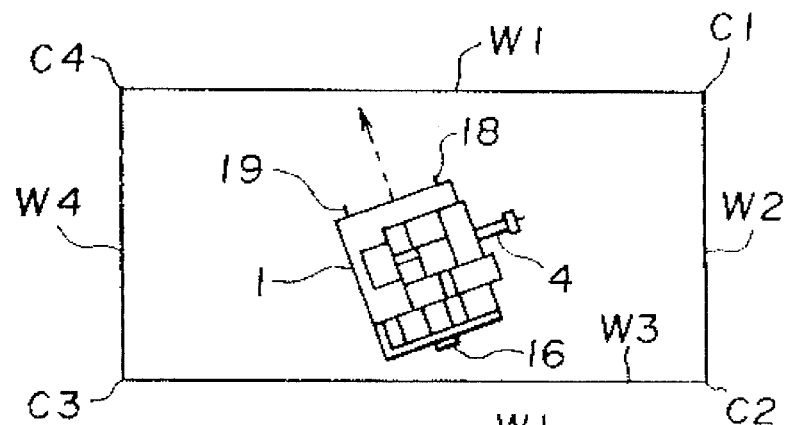
FIGS. 6(A)–6(D) are views illustrating an operation of a welding carriage at a welding start position in accordance with an embodiment of the present invention.

Firstly, an operation for setting a welding start position will be described with reference to FIGS. 6(A), 6(B), 6(C) and 6(D). As shown in FIG. 6(A), a welding robot is placed at an optionally selected position in the lattice block 20.

Figure 6B:
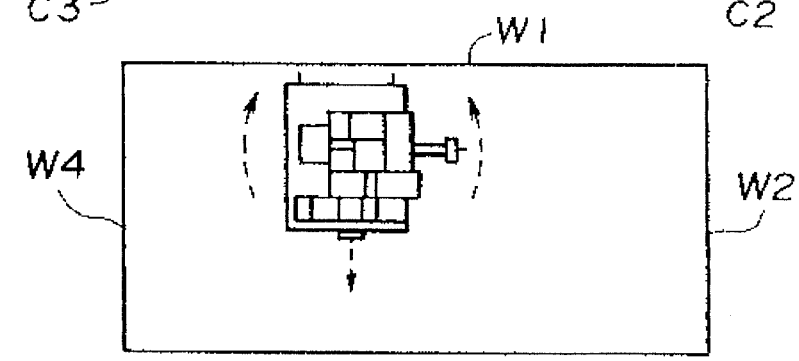

Then, as shown in FIG. 6(B), the carriage 1 is moved back, brought into contact with the vertical plate (W1 surface) as sensed by the limit switches 18 and 19, and is thereby set to be parallel with the vertical plate surface W1 (see FIG. 6(B)).

Figure 6C:
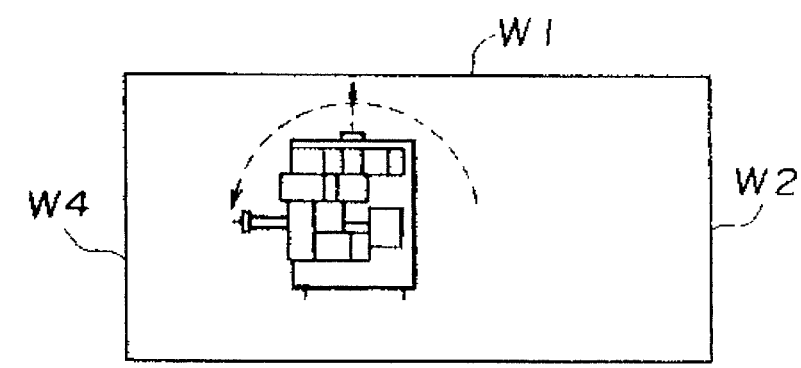
Figure 6D:
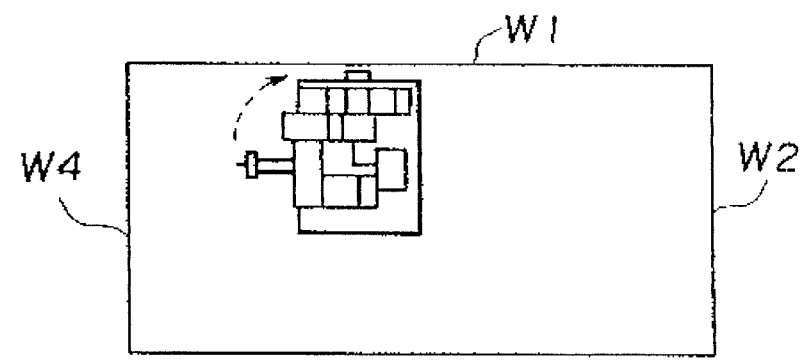

Afterward, as shown in FIG. 6(C), the carriage 1 is moved forward a certain distance so as to keep it spaced apart from the W1 surface, and subsequently is turned 180 degrees to the left. After the turning, as shown in FIG. 6(D), the carriage 1 is again moved forward. A position which is a predetermined distance away from the W1 surface is detected by the proximity switch 16, and then, the carriage 1 is stopped. Then, the carriage 1 is turned 90 degrees to the right, to the position shown in FIG. 7(A), and set to be at the welding start position. The turning angle is detected by the encoder 44 shown in FIG. 2(A).

Figure 7A:
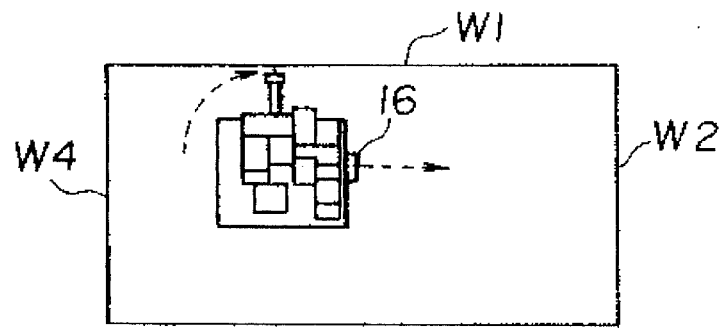
FIGS. 7(A)–7(E) are views illustrating a welding movement in accordance with the embodiment of the present invention.
Figure 7B:
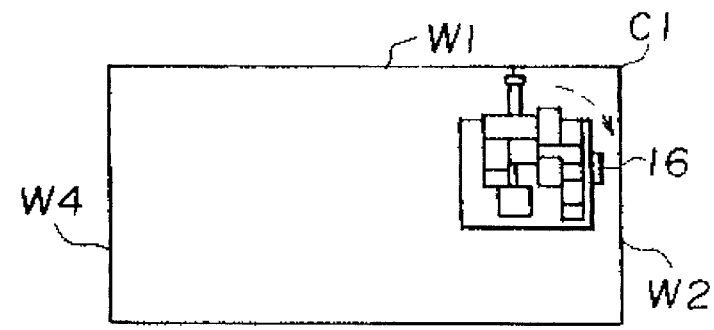

Next, as shown in FIGS. 7(A),7(B),7(C),7(D) and 70E), a high-speed rotating arc welding operation is started while the carriage 1 performs a rough guidance travel to the right. Firstly, as shown in FIG. 7(A), the robot performs straight welding along the straight weld line 2 on the W1 surface while carrying out a rough guidance control by using the arc sensor. When the carriage 1 reaches a predetermined position as shown in FIG. 7(B), it is stopped. This stop position is determined by detecting a predetermined distance from the W2 surface by using the proximity switch 16.

Figure 7C:
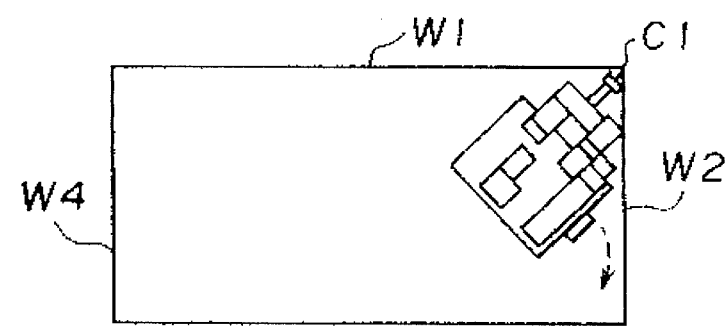

Then, as shown in FIG. 7(C), a corner portion C1 is welded while the carriage 1 is turned at the carriage stop position. During this turning operation, the drive motors 13 and 14 are driven respectively at the same speed in opposite directions, and the welding torch 4 with a high-speed rotating arc is fed (slid outwardly) in accordance with the turning angle by using the X-axis slide mechanism 5, to weld the comer portion C1 while the welding speed on the weld line 2 is kept constant. The relative positional relationship between the carriage while turning at the comer, and the tip end of the welding wire, are maintained such that the welding speed along the weld line is maintained constant at the corner portion being welded, and the welding speed at the corner portion is maintained so as to be substantially the same as the welding speed along the straight line portions of the weld line.

Figure 8:
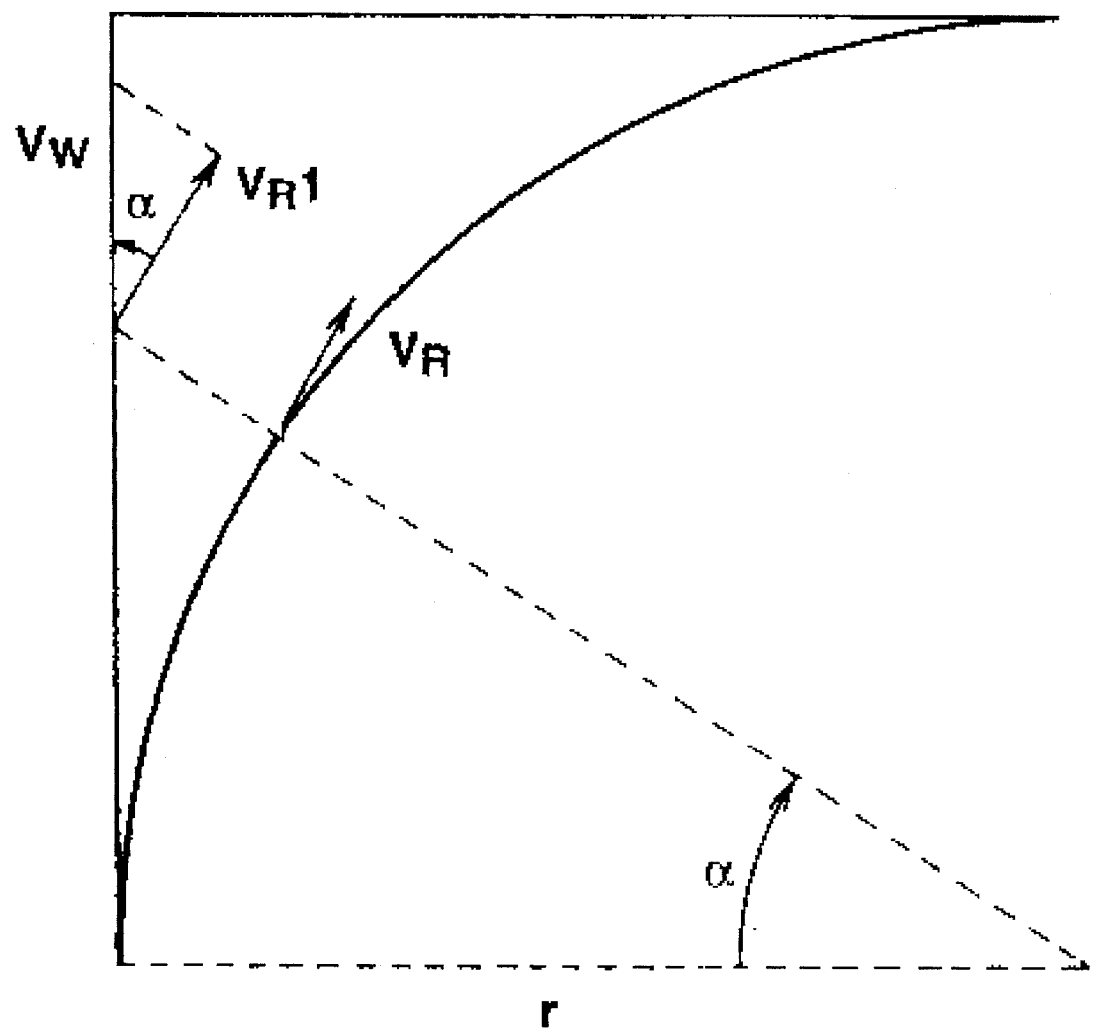
FIG. 8 is a view illustrating a welding speed control method at a corner portion.

FIG. 8 shows how a welding speed control is carried out at the corner portion. In this figure, the following two equations hold.

$$V_{R1} = r \times V_R/r \cos \alpha \qquad (1)$$
$$= V_R/\cos \alpha$$

$$V_w = V_{R1}/\cos \alpha \qquad (2)$$

where, $V_w$ is the actual welding speed along the weld line 2, $\alpha$ is a turning angle of the welding torch 4 with high-speed rotating arc welding, r is a turning radius, $V_R$ is a turning speed, and $V_{R1}$ is a speed component in a tangential direction of the turning arc of a welding speed $V_w$.

From the above equations (1) and (2), in the range of $0 \leq \alpha < \pi/4$, $$V_R = V_w \times \cos^2 \alpha \qquad (3)$$

and in the range of $\pi/4 \leq \alpha < \pi/2$, $$V_R = V_w \times \sin^2 \alpha \qquad (4)$$

By the two equations (3) and (4), the turning angle $\alpha$ is detected by the encoder 44 so that the welding speed $V_w$ at the corner portion is kept constant, by means of which a stable welding is performed.

Figure 7D:
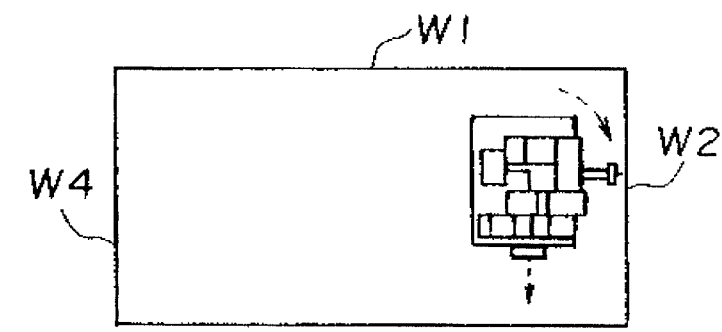
Figure 7E:
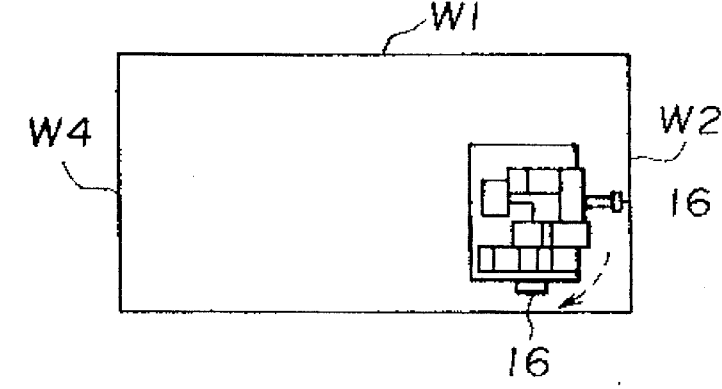

After the completion of the turning, all of the other welding lines 2 of the lattice block 20 are welded by repeating the same operations as shown in FIGS. 7(D) through 7(E).

The rough guidance travel mechanism of the carriage 1 and the control thereof in the welding of the straight portion of the above-described lattice block 20 will now be described.

As described above, the installation condition of the vertical plate 22 of the lattice block 20 is not always good; the vertical plate 22 often has distortion and a bend therein. Also, the travel direction of the carriage is changed by drawing a cable and the surface condition of work. For this reason, the welding speed at the weld line portion changes, or the range in which the torch aiming position can be corrected by the stroke limit of the arc sensor is limited, even though precise guidance control for weld line tracing is performed by the arc sensor. Therefore, to accurately trace the weld line by using the arc sensor, the carriage 1 must roughly trace the weld line 2 to some extent.

For this reason, in this embodiment, rough guidance for carriage travel is performed by a control system as shown in FIG. 4.

Firstly, the slide position $X_p$ in the X-axis direction of the welding torch 4 is detected by the arc sensor. The slide position $X_p$ is detected by the waveform of the arc voltage or welding current. The detection signal is sent to a comparator 31 and a differentiator 32. In the comparator 31, the signal $X_p$ is compared with a preset X-axis slide position reference value $X_0$, the difference signal $(X_p - X_0)$ is amplified by an amplifier 33 having a gain $k_1$, and the signal $k_1(X_p - X_0)$ is sent to a differential amplifier 35. In the differentiator 32, the time differential value $d\ X_p/dt$ of the inputted arc sensor signal $X_p$ is determined, the signal is amplified by an amplifier 34 having a gain $k_2$, and the signal $k_2 \times d\ X_p/dt$ is sent to the differential amplifier 35 as the other input.

Subsequently, in the differential amplifier 35, the position correction amount $\Delta\theta$ in the travel direction of the carriage 1 is determined by the following equation.

$$\Delta\theta = k_1(X_p - X_0) + k_2 \times d\ X_p/dt \qquad (5)$$

This value $\Delta\theta$ is sent to a computing unit or controller 36 to calculate the correction amount $\Delta V$ in the travel direction from $\Delta\theta$.

Then, the output signal $\Delta V$ from the computing unit (controller) 36 is fed to adders 39 and 40 through an amplifier 37 having a gain $k_3$ and an amplifier 38 having a gain $k_4$, respectively. The initial speed $V_0$ of the carriage 1 is given to the adders 39 and 40 from a standard welding speed setting unit 41. In the adder 39, the initial speed $V_0$ is added to the input signal $k_3 \Delta V$ from the amplifier 37, and the added speed command of $V_{in} = V_0 + k_3 \Delta V$ is issued to the drive motor 13 for the inside wheels to carry out speed control for the inside wheels 11. In the adder 40, the initial speed $V_0$ is added to the input signal $k_4 \Delta V$ from the amplifier 38, and the added speed command of $V_{out} = V_0 + k_4 \Delta V$ is issued to the drive motor 14 for the outside wheels to carry out speed control for the outside wheels 12.

A principle of the rough guidance control for the welding carriage travel of the present invention will now be described.

Figures 1A, 1B:
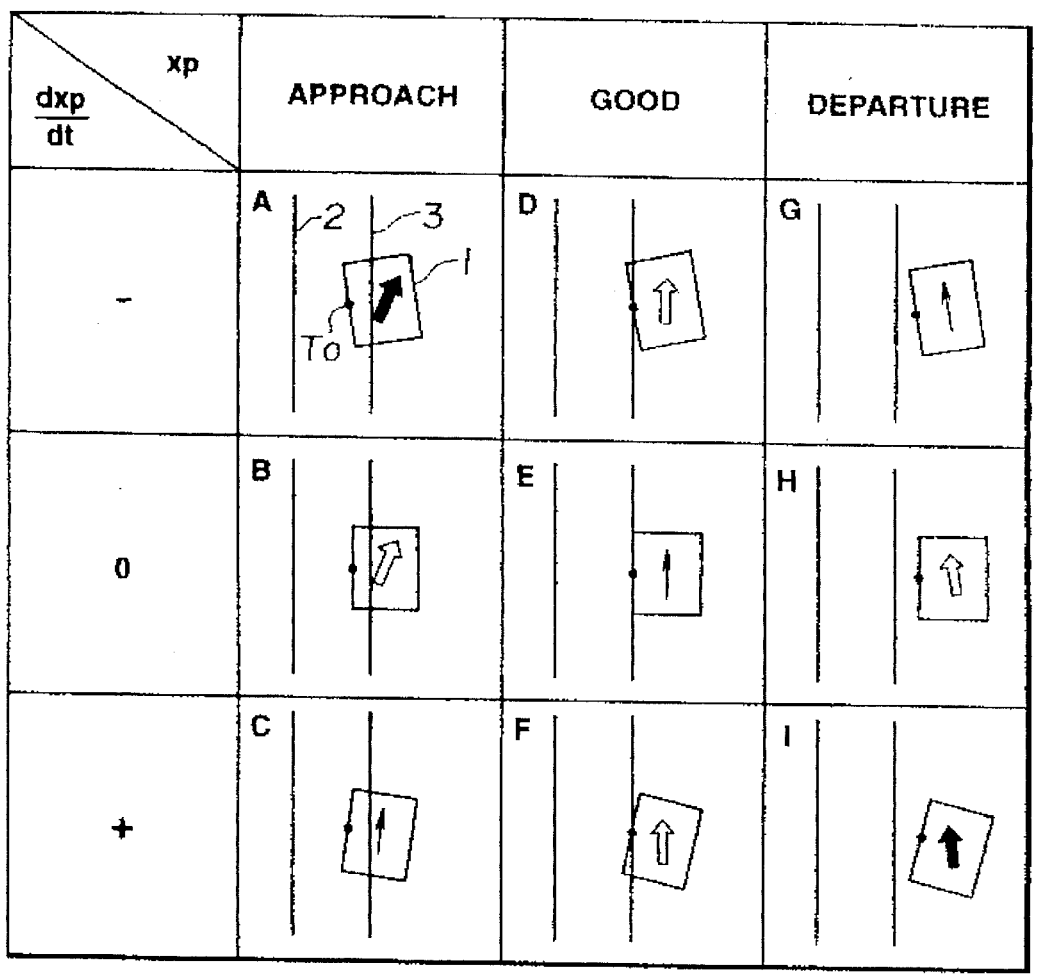
FIG. 1(A) and FIG. 1(B) show a control rule for rough guidance control for carriage travel using arc sensor signals in accordance with the present invention.

In FIGS. 1(A) and 1(B), the principle of the rough guidance control for the welding carriage travel is shown. FIG. 1(A) indicates schematically the distance of the welding carriage from the welding line 2 and an inclination by respective symbols of $X_p$ and $d\ X_p/dt$. Reference numeral 3 denotes a rough guidance line for the travel of the welding carriage. A distance between a reference point $T_0$ (note: $T_0$ is shown in FIG. 1(A)) of the welding torch and the weld line 2 is set in advance as a reference value $X_0$.

Based on the above mentioned information of the state of the carriage 1 two pieces of information, i.e. "$X_p$" and "$dX_p/dt$" from the arc sensor as shown in the FIG. 1(A), FIG. 1(B) shows commands for amending a travel direction for each of carriage states when they are classified into, for example, nine carriage states from A through I.

When the state of the welding carriage is in a state of, for example, A from FIG. 1(A), the welding carriage 1 is getting close to the weld line 2 and the carriage is inclined in a state such that the carriage 1 approaches the weld line 2. $X_p$ is defined to be the "approach" and $d X_p/dt$ is defined to be "minus". Therefore, to the carriage 1, a travel speed command of "great departure" is given so as to have the carriage 1 to immediately be apart from the weld line 2. In case of state B, the carriage 1 is close to the weld line 2, but is parallel with the weld line 2. Therefore, $X_p$ is defined as "approach" and $d X_p/dt$ is defined as "zero". The travel speed command of "slight departure" is given, since the carriage can soon be restored to a proper state. In case of state C, the carriage 1 is close to the welding line 2, but is inclined in a state such that the carriage 1 is apart from the weld line 2. $X_p$ is defined as "approach" and $d X_p/dt$ is defined to be "plus". At this moment, the travel speed command of "straight advance" is given. In case of state D, the carriage 1 is on a rough guidance travel line 3, but is inclined to be in a state such that the carriage 1 approaches the welding line 2. $X_p$ is defined as "good" ($X_p-X_0=0$) and $d X_p/dt$ is defined as "minus". At the moment, the travel speed command of "slight departure" is given so as to correct the inclination of the carriage. In case of state E, the carriage 1 is in the most preferred state. In this state, $d X_p-X_0=0$ and $d X_p/dt$ is defined as "zero". Therefore, the carriage 1 is allowed to advance straight as it does.

In case of state F, the carriage 1 is on the rough guidance travel line 3, but is inclined in a state such that the carriage 1 is apart from the weld line 2. $X_p-X_0=0$ and $d X_p/dt$ is defined as "plus". The travel speed command of "slight approach" is given. In case of state G, the carriage 1 is greatly apart from the weld line 2, but is inclined in a state such that the carriage 1 approaches the weld line 2. $X_p$ is defined as "approach" and $dX_p/dt$ is defined as "minus". The travel speed command of "straight advance" is given to correct the inclination. In case of state H, the carriage 1 is greatly apart from the weld line 2 and is parallel with the weld line 2. $X_p$ is defined as "departure" and $dX_p/dt$ is defined as "zero". The travel speed command of "slight approach" is given. In case of state I, the carriage 1 is greatly apart from the weld line 2 and is inclined in a state such that the carriage 1 is apart from the weld line 2. $X_p$ is defined as "departure" and $d X_p/dt$ is defined as "plus". The travel speed command of "great approach" is given so as to have the carriage restored to the state of "good".

The controller 36 of the present invention calculates the correction amount for the carriage travel speed of the inside and outside wheels from the difference between a comparator output value of $X_p-X_0$ and a differentiator output value of $d X_p/dt$. This correction amount $\Delta V$ is added to the initial travel speed $V_0$ of the inside and outside wheels by using the adders 39,40 to control the speed difference of both the inside and outside wheels and the travel speed command for each of the carriage states is based on the above-mentioned control principle. Based on the control principle, the rough guidance control for the carriage tracing operation is achieved exclusively by the state information from the arc sensor. That is, the speed of the inside wheels 11 is controlled by an adding speed command of $V_{in}$ and the speed of the outside wheels 12 is controlled by an adding speed command of $V_{out}$ dependent on every state of the welding carriage 1. Therefore, the rough guidance control for tracing the weld line 2 in the carriage 1 can be controlled by the speed difference $V_{in}-V_{out}$ of both the inside and outside wheels. For example, in the case of the state A in FIG. 1(A), the speed of the inside wheels 11 is increased by an amount corresponding to the added speed command $V_{in}$, and the speed of the outside wheels 12 is decreased by an amount corresponding to the added speed command $V_{out}$, by means of which the travel command of "great departure" is given to the carriage 1 to bring the carriage away from the weld line 2 rapidly.

Figure 10A:
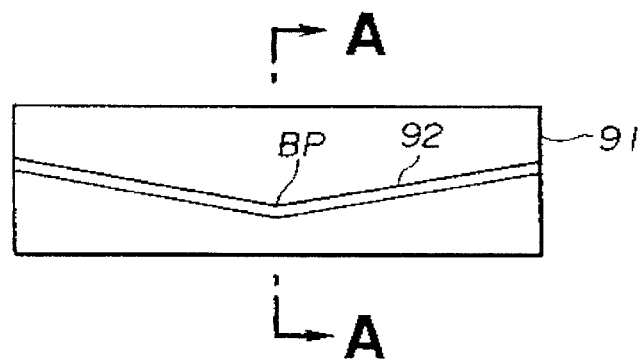
FIG. 10(A) is a plan view of a material for an experiment used in performing the rough guidance of the welding carriage to trace the weld line.
Figure 10B:
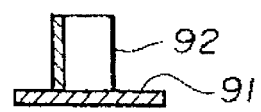
FIG. 10(B) is a sectional view of the material taken on line A—A of FIG. 10(A).

The accuracy of performance is examined by using a material for an experiment shown in FIG. 10(A) and FIG. 10(B) when a rough guidance for the welding carriage is performed to trace the weld line 2 in accordance with the present invention. As shown in FIG. 10(A) and FIG. 10(B), reference numeral 91 denotes a base plate with 1000 mm in length and 92 denotes a vertical plate which is bent at its center portion. The vertical plate 92 is bent by 20 degrees relative to a perpendicular plane. A fillet welding of the material was performed by using the lattice welding robot of the present invention on the terms and conditions given below.

Welding speed of the welding carriage B; 60 cm/min.

Electric current for welding; 220 A

Rotation of the welding torch; 50 HZ

Diameter of an arc rotation stroke; 2.5 mm

As values of gain by means of an equation (5) for obtaining a position correction amount, $K_1=0.03$ and $K_2-0.02$ were used. Those values are only examples and other values can be used. The unit of $(X_p-X_0)$ is mm and the unit of $dX_p/dt$ is mm/sec.

Figure 9:
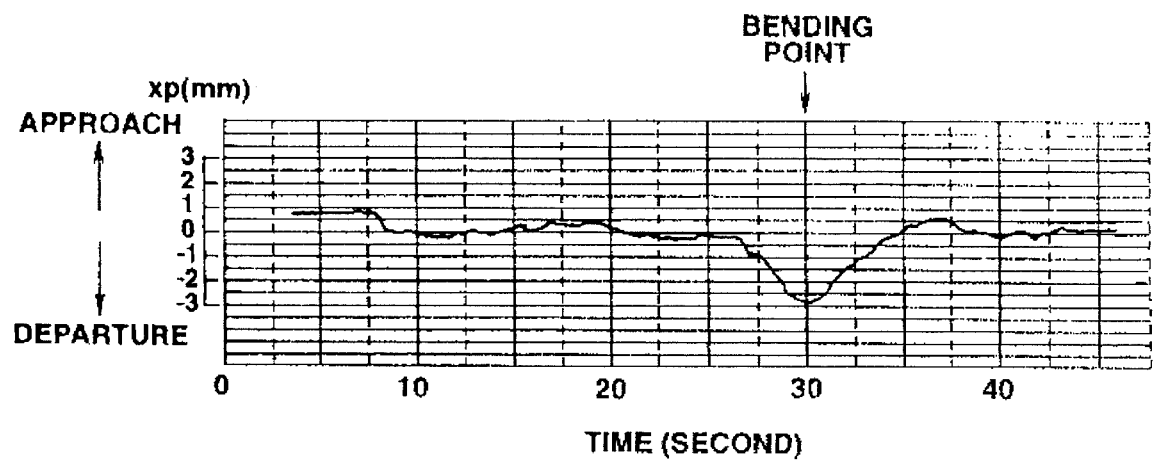
FIG. 9 is a graph showing how a welding torch changes a locus of $X_p$ of an X-axis slide position in accordance with lapse of time when the lattice welding robot of the present invention performs a rough guidance for a welding carriage to trace a weld line.

FIG. 9 shows a time difference as to how the welding torch changes a locus of an X-axis slide position, $X_p$ in lapse of time when a rough guidance for the welding carriage to trace a weld line is performed after a distance between the welding carriage and the weld line and an inclination of the welding carriage relative to the weld line have been varied. FIG. 9 shows that the X-axis slide position, $X_p$ is limited to plus or minus 1 mm from a standard point in a straight line portion except a bending point, BP and it is also limited to minus 3 mm from the standard point even on the bending point.

Although the position correction amount $\Delta\theta$ in the travel direction of the carriage 1 has been calculated from the above equation (5) in this embodiment, this correction amount $\Delta\theta$ can be caluculated by the following function.

$$\Delta\theta=f(X_p,dX_p/dt) \qquad (6)$$

In this case, a method in which the degree of addition is determined by a fuzzy control or a state classification shown in the following Table 1 can also be used.

TABLE 1

| | State of $X_p$ | | |
|---|---|---|---|
| $dX_p/dt$ | Approach | Normal | Departure |
| − | +2 | +1 | 0 |
| 0 | +1 | 0 | −1 |
| + | 0 | −1 | −2 |

As described above, the lattice welding robot of the present invention can detect the position and inclination of the carriage with respect to the weld line by only the signal of the X-axis slide position of the arc sensor of the welding torch with the high-speed rotating arc welding and the time differential value of the X-axis slide position or change per unit time. Therefore, the rough guidance control for tracing travel of the welding carriage can be achieved without the use of any other sensors or tracing guide rollers. Thus, the automatic fillet welding can be performed at a low cost and with high accuracy without being influenced by the condition of the vertical plate of the lattice block.

What is claimed is:

1. A lattice welding robot comprising:

a self-driven welding carriage having a pair of driving wheels which can be controlled independently to run and turn said welding carriage;

a welding torch mounted on said carriage for rotating a welding wire at a torch tip end at a high speed;

an X-axis slide mechanism for moving said welding torch in a horizontal direction relative to said carriage;

a Y-axis slide mechanism for moving said welding torch in a torch axis direction to keep a torch height constant;

a detector for detecting a corner portion of a member material to be welded so as to enable a turning operation at the corner portion to be carried out;

axis direction control means for controlling an X-axis direction position and a Y-axis direction position of the welding torch by using an arc sensor;

setting means for setting said welding carriage at a weld start position relative to said material to be welded; and a rough guidance controller for controlling a travel direction of said welding carriage, said rough guidance controller comprising
  an X-axis detector for detecting an X-axis slide position of said welding torch when said welding torch is controlled to be positioned at a center of a welding groove by said arc sensor;
  a comparator for comparing said detected X-axis slide position with a preset reference value of said X-axis slide position of said welding torch;
  a calculating unit for calculating a differential value of said detected X-axis slide position of said welding torch; and
  a control unit for controlling an advancing direction of said welding carriage by supplying independently an adding speed signal to said pair of driving wheels derived from the outputs of said comparator and said calculating unit so as to cause said carriage to run substantially parallel with said weld line and to keep a substantially constant distance between said welding carriage and said weld line, whereby said X-axis direction slide position of said welding torch is located at a proper position for welding.

2. The robot of claim 1, wherein said detector comprises a proximity switch.

3. The robot of claim 2, wherein said detector further comprises an encoder for detecting a turning angle of said carriage.

4. The robot of claim 3, wherein said setting means comprises a limit switch.

5. The robot of claim 1, wherein said setting means comprises a limit switch.

6. The robot of claim 1, wherein said X-axis slide mechanism and said Y-axis slide mechanism each comprise a ball screw feed mechanism.

7. The robot of claim 1, wherein said rough guidance controller includes; a first amplifier which receives a speed signal which is calculated from a deviation of said X-axis slide position of said welding torch; and a second amplifier which receives a signal which is a differentiated value of said X-axis slide position of said welding torch; the outputs of said amplifiers being coupled to said control unit.

8. The robot of claim 7, wherein said first and second amplifiers have different gains.

9. The robot of claim 7, wherein said control unit of said rough guidance controller includes two adders which respectively add an initial speed $V_0$ of said welding carriage to outputs from said first and second amplifiers to produce respective signals for driving respective driving motors of said driving wheels.

10. The robot of claim 9, wherein said initial speed is outputted from a standard welding speed setting unit.

11. The robot of claim 9, wherein said driving wheels comprise a pair of inside drive wheels and a pair of outside drive wheels, said inside drive wheels being closer to the welding groove than said outside drive wheels.

12. The robot of claim 1, wherein said driving wheels comprise a pair of inside drive wheels and a pair of outside drive wheels, said inside drive wheels being closer to the welding groove than said outside drive wheels.

13. A method of controlling a lattice welding robot during a welding operation, comprising:

providing a self-driven welding carriage having a pair of driving wheels which can be controlled independently to run and turn said welding carriage, said carriage having a welding torch mounted on said carriage for rotating a welding wire at a torch tip end at a high speed;

moving said welding torch in a horizontal direction relative to said carriage on an X-axis slide mechanism which is on said carriage;

moving said welding torch in a torch axis direction on a Y-axis slide mechanism which is on said carriage, to keep a torch height constant;

detecting a corner portion of a member material to be welded so as to enable the carriage to carry out a turning operation at the detected corner portion;

controlling an X-axis direction position and a Y-axis direction position of the welding torch by using an arc sensor;

setting said welding carriage at a weld start position relative to said material to be welded; and controlling a travel direction of said welding carriage by means of a rough guidance controlling operation, said rough guidance controlling operation comprising:
  detecting an X-axis slide position of said welding torch when said welding torch is controlled to be positioned at a center of a welding groove by said arc sensor;
  comparing said detected X-axis slide position with a preset reference value of said X-axis slide position of said welding torch;
  calculating a differential value of said detected X-axis slide position of said welding torch; and
  controlling an advancing direction of said welding carriage by supplying independently an adding speed signal to said pair of driving wheels, said adding speed signal being derived from outputs produced in said comparing step and said calculating step, so as to cause said carriage to run substantially parallel with said weld line and to keep a substantially constant distance between said carriage and said weld line, whereby said X-axis direction slide position of said welding torch is located at a proper position for welding.

14. The method of claim 13, comprising detecting said corner portion with a proximity switch.

15. The method of claim 14, wherein said step of detecting a corner portion comprises detecting a turning angle of said carriage by means of an encoder.

16. The method of claim 15, wherein said setting step comprises detecting said weld start position by a limit switch.

17. The method of claim 13, wherein said setting step comprises detecting said weld start position by a limit switch.

18. The method of claim 13, wherein said steps of moving said welding torch in said horizontal direction and in said torch axis direction are each carried out by a respective ball screw feed mechanism.

19. The method of claim 13, wherein said rough guidance controlling operation further includes:
 amplifying a speed signal which is calculated from a deviation of said X-axis slide position of said welding torch, to produce a first amplified signal; and
 amplifying a signal which is a differentiated value of said X-axis slide position of said welding torch, to produce a second amplified signal;
 said first and second amplified signals being coupled to said control unit.

20. The method of claim 19, wherein said speed signal and said signal which is a differentiated value are amplified by amplifiers having different gains.

21. The method of claim 19, wherein said controlling step of said rough guidance controlling operation includes respectively adding an initial speed (Vo) of said welding carriage to outputs from said first and second amplifiers to produce respective signals for driving respective driving motors of said driving wheels.

22. The method of claim 21, comprising outputting said initial speed from a standard welding speed setting unit.

23. The method of claim 21, wherein said driving wheels comprise a pair of inside drive wheels and a pair of outside drive wheels, and wherein said inside drive wheels are arranged closer to the welding groove than said outside drive wheels.

24. The method of claim 13, wherein said driving wheels comprise a pair of inside drive wheels and a pair of outside drive wheels, and wherein said inside drive wheels are arranged closer to the welding groove than said outside drive wheels.

25. A method of controlling a lattice welding robot during a welding operation, comprising:
 providing a self-driven welding carriage having a pair of driving wheels which can be controlled independently to run and turn said welding carriage, said carriage having a welding torch mounted on said carriage for rotating a welding wire at a torch tip end at a high speed;
 moving said welding torch in a horizontal direction relative to said carriage on an X-axis slide mechanism which is on said carriage;
 moving said welding torch in a torch axis direction on a Y-axis slide mechanism which is on said carriage, to keep a torch height constant;
 detecting a corner portion of a member material to be welded so as to enable the carriage to carry out a turning operation at the detected corner portion;
 setting said welding carriage at a weld start position relative to said material to be welded; and
 controlling a travel direction of said welding carriage by means of a rough guidance controlling operation, said rough guidance controlling operation comprising:
  detecting an X-axis slide position of said welding torch;
  comparing said detected X-axis slide position with a preset reference value of said X-axis slide position of said welding torch;
  calculating a differential value of said detected X-axis slide position of said welding torch; and
  controlling an advancing direction and speed of said welding carriage at said detected corner portion by supplying independently speeds signal to said pairs of driving wheels, said speed signals being derived from outputs produced in said comparing step and said calculating step, so as to cause said carriage to run along said weld line at a given speed at said detected corner portion and to keep a substantially constant distance between said carriage and said weld line at said detected corner portion, whereby said X-axis direction slide position of said welding torch is located at a proper position for welding.

26. The method of claim 25, comprising detecting said corner portion with a proximity switch.

27. The method of claim 25, wherein said step of detecting a corner portion comprises detecting a turning angle of said carriage by means of an encoder.

28. A method of controlling a lattice welding robot during a welding operation, comprising:
 providing a self-driven welding carriage having a pair of driving wheels which can be controlled independently to run and turn said welding carriage, said carriage having a welding torch mounted on said carriage for rotating a welding wire at a torch tip end at a high speed;
 moving said welding torch in a horizontal direction relative to said carriage on an X-axis slide mechanism which is on said carriage;
 moving said welding torch in a torch axis direction on a Y-axis slide mechanism which is on said carriage, to keep a torch height constant;
 controlling an X-axis direction position and a Y-axis direction position of the welding torch by using an arc sensor;
 setting said welding carriage at a weld start position relative to said material to be welded; and
 controlling a travel direction of said welding carriage by means of a rough guidance controlling operation, said rough guidance controlling operation comprising:
  detecting an X-axis slide position of said welding torch when said welding torch is controlled to be positioned at a center of a welding groove by said arc sensor;
  comparing said detected X-axis slide position with a preset reference value of said X-axis slide position of said welding torch;
  calculating a differential value of said detected X-axis slide position of said welding torch; and
  controlling an advancing direction of said welding carriage by supplying independently an adding speed signal to said pair of driving wheels, said adding speed signal being derived from outputs produced in said comparing step and said calculating step, so as to cause said carriage to run substantially parallel with said weld line and to keep a substantially constant distance between said carriage and said weld line, whereby said X-axis direction slide position of said welding torch is located at a proper position for welding.

29. The method of claim 28, wherein said setting step comprises detecting said weld start position by a limit switch.

30. The method of claim 28, wherein said steps of moving said welding torch in said horizontal direction and in said torch axis direction are each carried out by a respective ball screw feed mechanism.

31. The method of claim 28, wherein said rough guidance controlling operation further includes:

amplifying a speed signal which is calculated from a deviation of said X-axis slide position of said welding torch, to produce a first amplified signal; and amplifying a signal which is a differentiated value of said X-axis slide position of said welding torch, to produce a second amplified signal;

said first and second amplified signals being coupled to said control unit.

32. The method of claim 31, wherein said speed signal and said signal which is a differentiated value are amplified by amplifiers having different gains.

33. The method of claim 31, wherein said controlling step of said rough guidance controlling operation includes respectively adding an initial speed (Vo) of said welding carriage to outputs from said first and second amplifiers to produce respective signals for driving respective driving motors of said driving wheels.

34. The method of claim 33, comprising outputting said initial speed from a standard welding speed setting unit.

35. The method of claim 33, wherein said driving wheels comprise a pair of inside drive wheels and a pair of outside drive wheels, and wherein said inside drive wheels are arranged closer to the welding groove than said outside drive wheels.

36. The method of claim 28, wherein said driving wheels comprise a pair of inside drive wheels and a pair of outside drive wheels, and wherein said inside drive wheels are arranged closer to the welding groove than said outside drive wheels.

* * * * *